UNITED STATES PATENT OFFICE.

ANDREW M. FAIRLIE, OF ATLANTA, GEORGIA.

RECOVERY OF OXIDES OF NITROGEN IN SULPHURIC-ACID MANUFACTURE.

1,420,477. Specification of Letters Patent. Patented June 20, 1922.

No Drawing. Application filed May 19, 1920. Serial No. 382,519.

*To all whom it may concern:*

Be it known that I, ANDREW M. FAIRLIE, a citizen of the United States of America, residing at Atlanta, in the county of Fulton and State of Georgia, have invented certain new and useful Improvements in the Recovery of Oxides of Nitrogen in Sulphuric-Acid Manufacture, of which the following is a specification.

In the manufacture of sulphuric acid by the so-called chamber process, and also by some of the so-called tower processes, it is usual to treat gases containing sulfur dioxid and oxygen (or air) with oxides of nitrogen, this treatment being effected in the presence of moisture, the moisture being either in the form of steam or water vapor or in the form of a spray of liquid water or dilute acid containing water, or sometimes the water may be supplied in other ways. At the end of the acid-making apparatus a very large percentage of the nitrogen compounds introduced into the beginning of the acid making system exists in the gases in the form of oxides of nitrogen and these oxides can be referred to as the "higher oxides" and the "lower oxides" of nitrogen. The usual custom in the chamber process is to pass the gases leaving the last lead chamber through a tower commonly called a Gay-Lussac tower, in which the gases are treated with cool and moderately concentrated sulphuric acid, the concentration of the acid being such that it will absorb from the gases the major part at least of the oxides of nitrogen present in the gases. However, the absorption of nitrogen compounds in the Gay-Lussac tower as ordinarily operated, is not complete, and the gases leaving this tower may contain a substantial quantity of oxides of nitrogen.

In my previously issued Patent No. 1,205,723, describing an improvement in methods of manufacturing sulphuric acid, I stated that nitrogen oxides escaping from the last lead chamber of a sulphuric acid plant are most advantageously absorbed in the Gay-Lussac tower when a small percentage of sulfur dioxid (usually not less than .05% nor more than .15% by volume) is present in the gas mixture. Further experience of myself and others serves to confirm the truth of this statement.

In attempting to absorb in water the nitrogen oxides escaping absorption in the Gay-Lussac tower, I discovered that these residual nitrogen oxides were not readily nor completely absorbed in water. I ascertained that this failure to be readily absorbed by water was due to the presence in the gas mixture of the small quantity of sulfur dioxid referred to above, which kept a substantial part of the residual nitrogen oxides reduced to the lower state of oxidation. If a Gay-Lussac tower be used for the absorption of the nitrogen oxides, the presence of the small percentage of sulfur dioxid referred to is highly desirable. If a water absorption of residual oxides of nitrogen is to follow the Gay-Lussac tower absorption, these traces of sulfur dioxid are highly undesirable.

In accordance with the present invention, I aim to remove the total quantity of sulfur dioxid from the gases, whereby the oxides of nitrogen can readily combine with oxygen of the air present (or with oxygen introduced into the gases, either as such or in the form of air) whereby higher oxides of nitrogen will be formed, and subsequently I absorb, as completely as possible, these higher oxides of nitrogen.

Several different methods may be employed for the complete removal of the sulfur dioxid present in the gases, and for the purpose of illustration I give below four different methods by which such operation can be conveniently effected.

In the first modification, the gases from the Gay-Lussac tower of an acid plant, for example of the chamber type, are led through one or more towers in which the said gases are treated with lime, this preferably being hydrated lime, and either the dry hydrate or milk of lime or even lime water may be employed, but milk of lime is ordinarily to be preferred. Since the major part of the oxides of nitrogen present in the gases leaving the Gay-Lussac tower, are in the form of the lower oxides, milk of lime will not, under ordinary conditions, absorb or unite with any very considerable portion of these oxides, but the milk of lime will readily and substantially completely absorb the sulfur dioxid.

Air or oxygen may then be added to the gases, if the gases do not already contain a sufficient excess of free oxygen, and the gases may be conducted through suitable cooling and oxidizing apparatus, after which the gases are passed through suitable absorption apparatus in which they are treated with water, or (but not preferably) sulphuric acid or other absorbing medium. The passage of the gas through such latter absorption apparatus may conveniently be effected rather slowly in order to permit the lower oxides of nitrogen to become substantially completely oxidized to the higher oxides of nitrogen which latter are readily absorbable in water with the production of nitric acid. In order to prevent as much as possible, oxidation of the lower oxides of nitrogen to the higher oxides in the lime treating towers or absorbers, it is advisable to pass the gases through the lime apparatus at a rather rapid rate, since it is not desired to absorb any substantial quantities of the oxides of nitrogen by the lime.

In the second of the processes mentioned by way of example as illustrative of the present invention, I may pass the gases leaving the Gay-Lussac tower, with or without the addition of free oxygen (e. g., air) through an apparatus for the catalytic oxidation of $SO_2$ to $SO_3$. Preliminary to this operation the gases are preferably heated up considerably, which may be done in large part by a suitable interchanger, after which the gases are passed over or through a suitable catalyzer material, as in the contact process of making sulphuric acid, and thereafter the heat of the gases leaving the catalyzer is imparted to the cooler entering gases. The $SO_3$ formed in this operation may be suitably removed, for example by absorption in strong sulphuric acid, or by condensation after adding steam or water or liquid sulphuric acid. The gases may then be passed through appropriate apparatus for further cooling and oxidation, and are then passed into and through the nitrogen oxide absorbers, as above referred to.

The third modification of this invention is similar to the second, except that instead of completely oxidizing the sulfur dioxid by a catalytic process, the complete oxidation of the sulfur dioxid is effected by treatment with a chemical oxidizing agent, such as bromine, iodine, chlorine, bleaching powder, sodium or hydrogen peroxide, a permanganate, a ferric or other highly oxidized salt, or the like, in either solid, liquid or gaseous form, in appropriate apparatus, according to the nature of the oxidizing agent employed.

As a fourth form of execution of the present invention, the gases from the last lead chamber may be used without previous treatment in a Gay-Lussac tower. In this form of operation, the gases are passed from the last lead chamber into a chamber made of material resistant to nitric acid, such as acid-proof masonry made of acid-proof brick or tile laid in acid-proof cement. More or less air or oxygen-containing gases may be admitted into the gases entering this masonry chamber. The size of the masonry chamber will vary considerably, from 1 to 25% of the total lead chamber space may be needed and in most cases between 5 and 15% of the total lead chamber space will be found to be a sufficient size for the masonry chamber. In this masonry chamber the entire amount of $SO_2$ present in the gases will be converted into sulphuric acid and substantially the entire quantity of lower oxides of nitrogen present in the gases will be converted into higher oxides of nitrogen, and the chamber should be large enough to allow the first mentioned of these results to be secured. It would not be expedient to convert the entire amount of $SO_2$ into surphuric acid in ordinary lead chambers, since this would involve such an excess of the higher oxides of nitrogen in the gases, as would be liable to result in rapid destruction of the lead chamber. However, the masonry chamber above referred to being made of material which is resistant to both nitric and sulphuric acids, the excess of higher oxides if nitrogen in the gases can do no harm. The sulphuric acid formed may be condensed, or it may proceed as mist into the absorbing apparatus.

For a single masonry chamber, or other type of chamber resistant to nitric acid, a series or group of such chambers may be substituted, for the complete oxidation of the sulfur dioxid and the lower oxides of nitrogen. Since the oxidation of the lower oxides of nitrogen goes on more rapidly if the gas mixture is cool, it is usually preferable to intermingle oxidation chambers with cooling devices or apparatus, whereby the gases may be cooled by means of flowing water (usually in indirect contact), or in some other manner. By this means the gas mixture, after complete oxidation of the sulfur dioxid, may be cooled to a temperature more favorable for the rapid oxidation of the lower oxides or nitrogen.

After leaving the oxidation apparatus, a further quantity of air or oxygen may be added to the gases if desired, after which the gases may travel to a suitable apparatus for the absorption of the higher oxides of nitrogen, for example the water absorbers above referred to.

It will thus be seen that in the various modifications of my process forming the subject matter of the present application, I first treat the exit gases of any system in which sulphuric acid is manufactured by the employment of oxides of nitrogen, to remove from such gases as completely as possible, the sulfur dioxid present therein and I recover the sulphuric acid formed, and I allow and induce the conversion of the lower oxides of nitrogen present as completely as possible into the higher oxides of nitrogen, cooling the gases to facilitate this conversion, if desired, and I absorb the higher oxides of nitrogen, preferably in water to form nitric acid. The absorption of the higher oxides of nitrogen is preferably performed in acid-resisting masonry towers or other acid-resisting apparatus. A suitable tower for use in the process is that described in my co-pending application filed April 21, 1920.

In this latter operation, a high efficiency can be secured, since substantially all of the nitrogen is in the form of the higher oxides. If desired, the gases escaping from the water treatment may be subjected to a lime or alkaline treatment, to more completely recover the nitrogen oxides. In some instances it might be advisable, in place of employing apparatus in which the oxides of nitrogen are absorbed in water, to employ an ordinary Gay-Lussac tower fed with sulphuric acid of the strength adapted for absorption of the oxides of nitrogen, or some other suitable absorbing medium may be employed.

The nitric acid or nitrosulphuric acid, or other nitrogen compound, produced by the absorption of the oxides of nitrogen by any of the modifications of the methods herein described can be utilized, for example by feeding to the Glover tower or towers, or by otherwise introducing into the sulphuric acid-making system.

The invention herein described comprises, then, the following steps, as applied (a) to Gay-Lussac exit gases, and (b) to lead chamber exit gases:

1. Substantially complete elimination from the gas mixture of traces of sulfur dioxid, either by—
   (a) Absorption in lime water or alkali.
   (b) Oxidation by catalytic agent.
   (c) Oxidation by chemical oxidizing agent.
   (d) Oxidation by air or oxygen, as in modification 4.
2. Hydration of the sulfur trioxid and precipitation as sulphuric acid if desired.
3. Cooling the gas mixture, if desired.
4. Oxidation of lower oxides of nitrogen to higher oxides, with or without the addition of oxygen or air. (Steps 3 and 4 may be continued alternately as frequently as desired.)
5. Absorption of oxides of nitrogen, preferably in water.
6. Utilization of the recovered oxides of nitrogen by returning same to the sulphuric acid-making system. (This step may be omitted if desired, and the nitrogen compounds used or disposed of otherwise.)

The principal advantages which this invention offers over the prior art are:

1. A higher yield of sulphuric acid. The amount of sulfur dioxid escaping from the Gay-Lussac tower amounts to at least one per cent, and in many cases to two or three per cent, or more, of the total sulfur dioxid admitted to the Glover tower. All of this escaping sulfur dioxid is by several modifications of my method, recovered as liquid sulphuric acid.

2. A higher percentage of recovery of nitrogen oxides, resulting in a substantial economy in operating expenses for sulphuric acid manufacture.

3. Modification 4, which eliminates the sulphuric acid-fed Gay-Lussac tower, also eliminates the disadvantages of circulating a large quantity of sulphuric acid over Gay-Lussac and Glover towers, which include:

(a) Impeded draft, due to sediment deposited by the circulating sulphuric acid in the interstices of the tower packing, resulting in waste of power for moving the gases, in impaired efficiency of the plugged Gay-Lussac tower as an absorber of nitrogen oxides, and in waste of sulfur dioxid.

(b) Waste of labor, water, sulphuric acid, and oxides of nitrogen, while washing sediment out of a plugged tower.

(c) Expense of cooling a large quantity of sulphuric acid (usually two or three times the daily capacity of the plant) for use on the Gay-Lussac tower.

(d) Loss of sulphuric acid as spray or mist in the exit gases from the Gay-Lussac tower.

I claim:

1. A process of recovering the nitrogen oxides present in the exit gases discharged from a sulphuric acid manufacturing plant, which consists in first substantially completely removing the sulfur dioxide from such gases, thereafter oxidizing the oxides of nitrogen to the higher state of oxidation and absorbing the same.

2. A process of recovering the nitrogen oxides present in the exit gases of sulphuric acid manufacture which comprises substantially completely oxidizing the sulfur dioxid content thereof and the lower oxides of nitrogen, and absorbing the oxides of nitrogen in water.

3. A process of recovering the nitrogen oxides present in the gases leaving the last lead chamber (or its technical equivalent) of a sulphuric acid manufacturing plant employing a nitration process, which consists in passing such gases into a structure resistant to the action of nitric acid, allowing or causing therein the substantially complete oxidation of the sulfur dioxide, and allowing or causing the oxidation of the bulk of the lower oxides of nitrogen into the higher oxides to take place, and thereafter absorbing the latter.

4. The process of removing from the exit gases of a sulphuric acid manufacturing plant, the normal content of sulfur dioxid therein, oxidizing the lower oxides of nitrogen to higher oxides, and absorbing the latter.

5. A process of recovering the oxides of nitrogen present in the gases leaving a sulphuric acid-making apparatus employing oxides of nitrogen, which consists in substantially completely removing the sulfur dioxid from such gases, thereafter cooling the remaining gases containing the oxides of nitrogen while in contact with a substantial excess of free oxygen, whereby the lower oxides are oxidized to the higher oxides, and finally absorbing the latter.

6. A process of treating the gases leaving an apparatus for the manufacture of sulphuric acid involving the use of oxides of nitrogen, which comprises, first, substantially completely removing the sulfur dioxid from such gases by oxidizing and hydrating the same to produce an additional quantity of sulphuric acid, then oxidizing substantially the entire amount of the lower oxides of nitrogen present in the gases into the higher oxides, and finally absorbing the said higher oxides of nitrogen.

In testimony whereof I affix my signature.

ANDREW M. FAIRLIE.